(12) United States Patent
Krishnamurthy et al.

(10) Patent No.: US 10,878,690 B2
(45) Date of Patent: Dec. 29, 2020

(54) UNIFIED STATUS AND ALARM MANAGEMENT FOR OPERATIONS, MONITORING, AND MAINTENANCE OF LEGACY AND MODERN CONTROL SYSTEMS FROM COMMON USER INTERFACE

(71) Applicant: Honeywell International Inc., Morris Plains, NJ (US)

(72) Inventors: Ananthapadmanabha Krishnamurthy, Bangalore (IN); Ellen B. Hawkinson, Phoenix, AZ (US); David Barry Granatelli, Lilyfield (AU)

(73) Assignee: Honeywell International Inc., Charlotte, NC (US)

( * ) Notice: Subject to any disclaimer, the term of this patent is extended or adjusted under 35 U.S.C. 154(b) by 14 days.

(21) Appl. No.: 16/038,425

(22) Filed: Jul. 18, 2018

(65) Prior Publication Data
US 2019/0130734 A1 May 2, 2019

Related U.S. Application Data

(60) Provisional application No. 62/580,521, filed on Nov. 2, 2017.

(51) Int. Cl.
*G08B 29/22* (2006.01)
*G06F 3/0484* (2013.01)
*G06F 3/0482* (2013.01)

(52) U.S. Cl.
CPC .......... *G08B 29/22* (2013.01); *G06F 3/0482* (2013.01); *G06F 3/04847* (2013.01)

(58) Field of Classification Search
CPC ...................................................... G08B 29/22
(Continued)

(56) References Cited

U.S. PATENT DOCUMENTS 7,113,085 B2 * 9/2006 Havekost ............. G05B 23/027
340/506
9,990,836 B2 * 6/2018 Will .................... G08B 21/0461
(Continued)

OTHER PUBLICATIONS

Honeywell Process Solutions, "Advanced Process Manager Control Functions and Algorithms," AP09-600, TotalPlant, Release 650, Dec. 2003, 370 pages.
(Continued)

*Primary Examiner* — William D Titcomb (57) ABSTRACT

A method includes receiving information associated with one or more first alarms in a first control system and generating a graphical user interface containing information associated with a second control system. The method also includes presenting, in the graphical user interface, at least a portion of the information associated with the one or more first alarms. The method further includes receiving, from a user via the graphical user interface, an invocation of an alarm management function. In addition, the method includes performing the invoked alarm management function using at least one of the one or more first alarms. The alarm management function could include acknowledging, shelving, and/or filtering the at least one of the one or more first alarms. The first control system may not support acknowledging, shelving, and filtering of alarms, while the second control system may support acknowledging, shelving, and filtering of alarms.

22 Claims, 7 Drawing Sheets

(58) Field of Classification Search
USPC .......................................................... 715/736
See application file for complete search history.

(56) References Cited

U.S. PATENT DOCUMENTS

| | | | | |
|---|---|---|---|---|
| 10,348,575 B2* | 7/2019 | Sundermeyer | ........ | H04L 12/281 |
| 2002/0055790 A1* | 5/2002 | Havekost | .............. | G05B 23/027 |
| | | | | 700/80 |
| 2007/0043476 A1* | 2/2007 | Richards | .................. | F24F 11/62 |
| | | | | 700/276 |
| 2009/0146846 A1* | 6/2009 | Grossman | ............... | B60R 25/04 |
| | | | | 340/988 |
| 2011/0001605 A1* | 1/2011 | Kiani | .................... | G06F 3/0482 |
| | | | | 340/5.6 |
| 2011/0010654 A1* | 1/2011 | Raymond | .............. | G06N 5/025 |
| | | | | 715/772 |
| 2011/0126111 A1* | 5/2011 | Gill | ........................ | G06F 21/577 |
| | | | | 715/736 |
| 2012/0042000 A1* | 2/2012 | Heins | ..................... | G06Q 10/10 |
| | | | | 709/201 |
| 2012/0224057 A1* | 9/2012 | Gill | ........................ | H04L 63/102 |
| | | | | 348/143 |
| 2012/0314063 A1* | 12/2012 | Cirker | ............. | G08B 13/19697 |
| | | | | 348/143 |
| 2015/0156031 A1* | 6/2015 | Fadell | ................. | H04L 12/2816 |
| | | | | 700/276 |
| 2015/0316923 A1 | 11/2015 | Strilich et al. | | |
| 2015/0378328 A1 | 12/2015 | Gustin et al. | | |
| 2016/0043905 A1* | 2/2016 | Fiedler | .................. | G06F 3/0482 |
| | | | | 715/736 |
| 2016/0065414 A1* | 3/2016 | Sundermeyer | ........ | G06F 3/0488 |
| | | | | 370/254 |
| 2016/0104358 A1* | 4/2016 | Meier | .................... | B64D 45/00 |
| | | | | 340/628 |
| 2016/0110994 A1* | 4/2016 | Taylor | .................... | G08B 29/22 |
| | | | | 340/514 |
| 2016/0132046 A1* | 5/2016 | Beoughter | ......... | G05B 19/4184 |
| | | | | 700/17 |
| 2016/0195856 A1* | 7/2016 | Spero | ..................... | G06N 5/046 |
| | | | | 700/90 |
| 2016/0241988 A1* | 8/2016 | Slevin | ..................... | H04W 4/70 |
| 2017/0023963 A1* | 1/2017 | Davis | .................... | H04W 48/16 |
| 2017/0199631 A1* | 7/2017 | Coffman | ............. | H04L 12/1827 |
| 2017/0222895 A1 | 8/2017 | Rachlin | | |
| 2017/0309142 A1* | 10/2017 | Phillips | .................. | G05D 15/02 |
| 2018/0109955 A1* | 4/2018 | Nixon | .................... | G05B 15/02 |
| 2018/0131907 A1* | 5/2018 | Schmirler | .............. | H04N 7/181 |
| 2019/0050414 A1* | 2/2019 | Maturana | ........... | G05B 19/4185 |
| 2019/0102059 A1* | 4/2019 | Strinden | .......... | G05B 19/41835 |
| 2019/0102072 A1* | 4/2019 | Strinden | ............. | G06F 3/04847 |
| 2019/0102076 A1* | 4/2019 | Naidoo | ................. | G06F 3/0482 |
| 2019/0391825 A1* | 12/2019 | Jann | ..................... | G06F 3/04847 |

OTHER PUBLICATIONS

Honeywell International Inc., "Stewardship and Vision: The Continuous Evolution of Legacy Controllers," Sep. 2011, 2 pages.
Honeywell International Inc., "Upgrade from TDC and TPS to Experion," Solution Note, SO-06-34-ENG, Dec. 2006, 3 pages.
Ochsner, "Migration Solutions for Non-Honeywell Systems," Honeywell Users Group 2010, 2010, 29 pages.

* cited by examiner

MAKE SELECTION                                           24 Feb 17 10:34:29   4
SYS VERS: R686                       SYSTEM STATUS FROM US 90    NETWORK VIEW <>    PAGE 1
NCF VERS: 23Feb17 19:20:10:365
CABLE A: SUSPECT      CABLE B: SUSPECT ← 304
                    ↑ 312                              ↓ 306

| US01 UxS FAIL | US02 EST OK | US03 PWR_ON | US04 UNVL MAINT | HM05 HMON OK | HM06 HMON OK | HM07 HMON OK | NM08 FAIL | US09 OFF | US10 OFF | US11 OFF | US12 EST FAIL | AM13 OFF |
| US14 EST FAIL | US15 EST OK | US16 OFF | US17 UxS FAIL | AM18 APP OK | AM19 AM OK | US20 EST OK | US21 FAIL | US22 EST OK | US23 QUALIF | US24 OFF | AM25 AM OK | US26 FAIL |
| US27 EST OK | AM28 FAIL | US29 OFF | US30 EST OK | AM31 PWR_ON | US32 EST OK | AM33 AM OK | AM34 FAIL | AM35 OFF | US36 EST OK | NM37 OFF | AM38 APP OK | AM39 AM OK |
| AM40 OFF | AM41 FAIL | AM42 AM OK | AM43 OFF | AM44 APP OK | AM45 ESVT OK | AM46 OK | AM47 PWR_ON | AM48 ESVT OK | AM49 APP OK | AM50 OFF | AM51 OK | AM52 APP FAIL |
| AM53 OFF | HG54 HG FAIL | NM55 NIM WARN | NM56 FAIL | HG57 EHB OK | HG58 EHB BACKUP | HG59 HG OK | AM60 APP OK | HG61 HG BACKUP | HG62 PWR_ON | HM63 HMON OK | HM64 HMON OK | DISABL SYS ALM |

↑ 310

| LOAD CONFIG | SAVE CONFIG | SHOW LOADS | OVERRIDE AUX INFO | SHOW PRIM/SEC | SHOW NTWK/HWY | SHOW PERS | LCN DIAG |
| LOAD ISOL | LOAD FAIL | LOAD PWR_ON | SINGLE NODE OPS | SHOW CONSOLE | SHOW LCN COMM | SHOW HST COLL | EVENT RECOVERY |

TIME/DATE ← 308
                          ↓ 300                    ← 302

UNIFIED STATUS AND ALARM MANAGEMENT FOR OPERATIONS, MONITORING, AND MAINTENANCE OF LEGACY AND MODERN CONTROL SYSTEMS FROM COMMON USER INTERFACE

CROSS-REFERENCE TO RELATED APPLICATION AND PRIORITY CLAIM

This application claims priority under 35 U.S.C. § 119(e) to U.S. Provisional Patent Application No. 62/580,521 filed on Nov. 2, 2017. This provisional application is hereby incorporated by reference in its entirety.

TECHNICAL FIELD

This disclosure generally relates to industrial process control and automation systems. More specifically, this disclosure relates to an apparatus and method for providing unified status and alarm management for operations, monitoring, and maintenance of legacy and modern control systems from a common user interface.

BACKGROUND

Industrial process control and automation systems are often used to automate large and complex industrial processes. These types of systems routinely include various components including sensors, actuators, and controllers. Some of the controllers can receive measurements from the sensors and generate control signals for the actuators. Process control and automation systems have evolved greatly over the last four decades. Often times, this has necessitated the co-existence and simultaneous use of older legacy control systems and newer control systems, resulting in a "hybrid" control infrastructure.

SUMMARY

This disclosure provides an apparatus and method for providing unified status and alarm management for operations, monitoring, and maintenance of legacy and modern control systems from a common user interface.

In a first embodiment, a method includes receiving information associated with one or more first alarms in a first control system and generating a graphical user interface containing information associated with a second control system. The method also includes presenting, in the graphical user interface, at least a portion of the information associated with the one or more first alarms. The method further includes receiving, from a user via the graphical user interface, an invocation of an alarm management function. In addition, the method includes performing the invoked alarm management function using at least one of the one or more first alarms.

In a second embodiment, an apparatus includes at least one processor configured to receive information associated with one or more first alarms in a first control system and generate a graphical user interface containing information associated with a second control system. The at least one processor is also configured to initiate presentation, in the graphical user interface, of at least a portion of the information associated with the one or more first alarms. The at least one processor is further configured to receive, from a user via the graphical user interface, an invocation of an alarm management function. In addition, the at least one processor is configured to perform the invoked alarm management function using at least one of the one or more first alarms.

In a third embodiment, a non-transitory computer readable medium contains instructions that when executed cause at least one processing device to receive information associated with one or more first alarms in a first control system and generate a graphical user interface containing information associated with a second control system. The medium also contains instructions that when executed cause the at least one processing device to initiate presentation, in the graphical user interface, of at least a portion of the information associated with the one or more first alarms. The medium further contains instructions that when executed cause the at least one processing device to receive, from a user via the graphical user interface, an invocation of an alarm management function. In addition, the medium contains instructions that when executed cause the at least one processing device to perform the invoked alarm management function using at least one of the one or more first alarms.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, industrial process control and automation systems have evolved greatly over the last four decades. Often times, this has necessitated the co-existence and simultaneous use of older legacy control systems and newer control systems, resulting in a "hybrid" control infrastructure. In many if not all cases, hybrid control systems have different user interfaces for different personnel, such as engineering, operations, monitoring, and maintenance personnel. Unfortunately, this often forces the personnel using these systems to gain and maintain the skills needed to operate these multiple systems. Moreover, user interfaces of legacy control systems are often outdated, less intuitive, less user friendly, and not as abnormal situation management (ASM)-compliant as modern control systems. In addition, younger or less-experienced engineers can find it difficult to troubleshoot problems in legacy control systems.

One of the common gaps or differences between legacy and modern control systems is the way in which system alarms are notified and managed. As a particular example of this, TDC3000 distributed control system (DCS) components from HONEYWELL INTERNATIONAL INC. are an example of legacy control system components, and EXPERION PKS control system components from HONEYWELL INTERNATIONAL INC. are an example of modern control system components. In TDC3000 systems, a system alarm is bound to a display context containing one or more system components that are in alarm, and system alarm management functions (such as monitoring alarm statuses or acknowledging alarms) are performed in the context of a complex hierarchy of system displays. Moreover, a composite status can be aggregated from system alarms, but this is tightly coupled with the complex hierarchy of system displays. This type of system alarm notification model is highly console operator-centric and can severely limit the ability of an operator to effectively troubleshoot and maintain a system, which can be due to a number of factors (such as a lack of alarm details like a description or a time of occurrence on a console station). Even if this data is available in the form of state change events in a journal history, the state change events are not classified as system alarms and are not made available for real-time view under a separate system alarm display.

Because of such an implementation, legacy TDC3000 control systems lack advanced alarm features like alarm shelving and alarm filtering. These advanced features are available in modern EXPERION PKS control systems, but they are not extended to TDC3000 system events. Moreover, there are cases where a single modern physical node has multiple "views," one being a legacy TDC3000 view and the other being a modern EXPERION PKS view. As particular examples, a modern node such as an ENHANCED NETWORK INTERFACE MODULE (ENIM) from HONEYWELL INTERNATIONAL INC. could replace a legacy NETWORK INTERFACE MODULE (NIM) from HONEYWELL INTERNATIONAL INC. As another example, a modern node such as an EXPERION HIWAY BRIDGE (EHB) from HONEYWELL INTERNATIONAL INC. could replace a legacy HIWAY GATEWAY (HG) or local control network (LCN) emulation. These modern nodes perform the same functions as their legacy equivalents, but these modern nodes have additional status and system alarms that do not exist in their legacy equivalents. Due to limitations in the legacy software that runs on the modern platforms, these additional status and system alarms can be shown in a modern system (such as a CONTROL BUILDER or STATION object in EXPERION PKS), while the legacy status and system events are only shown in a legacy user interface (such as a NATIVE WINDOW in a TDC3000 system).

Considering the operational and maintenance challenges involved in a hybrid control system, it may be necessary or desirable to enable EXPERION PKS control systems to support system status and alarm monitoring of legacy TDC3000 control systems, thereby extending modern alarm management features to the legacy systems. Also, this would enable a unified user interface for system operations, monitoring, and maintenance. Further, this would enable the unified user interface to show the states and system alarms from both TDC3000 and EXPERION PKS views for the same physical device or the same set of physical devices in one place. Similar functionality could be needed or desired for any other suitable combination of legacy and modern control systems.

In accordance with this disclosure, techniques are provided for supporting unified status and alarm management for operations, monitoring, and maintenance of legacy and modern control systems from a common user interface. For example, these techniques could allow system status and alarm reporting and management functionality to be embedded within a system management dashboard, alarm display, or other graphical display associated with the modern control system. Statuses and alarms associated with the legacy control system can be presented in the graphical display along with statuses and alarms associated with the modern control system. The system management dashboard for a hybrid node having multiple views (such as a TDC3000 view and an EXPERION PKS view) supports all system statuses and system alarm equivalents of all state changes that exist in the legacy equivalents and additional modern network status/alarms and EXPERION PKS statuses and notifications. The modern network status/alarms and EXPERION PKS status parameters and notifications are not available in the legacy user interface. Various functions could also be invoked by one or more users via the graphical display.

In this way, these techniques provide a unified mechanism for users to view and potentially interact with both legacy and modern control systems from a common user interface. As a result, personnel using these systems are not required to learn and understand older legacy user interfaces. Moreover, the common user interface can be updated more easily, be more intuitive and user friendly, and support ASM-compliant operations. In addition, younger or less-experienced engineers (who are often trained to understand the operations of modern control systems) can find that the common user interface offers an easier way to troubleshoot problems in the legacy control systems.

Figure 1:
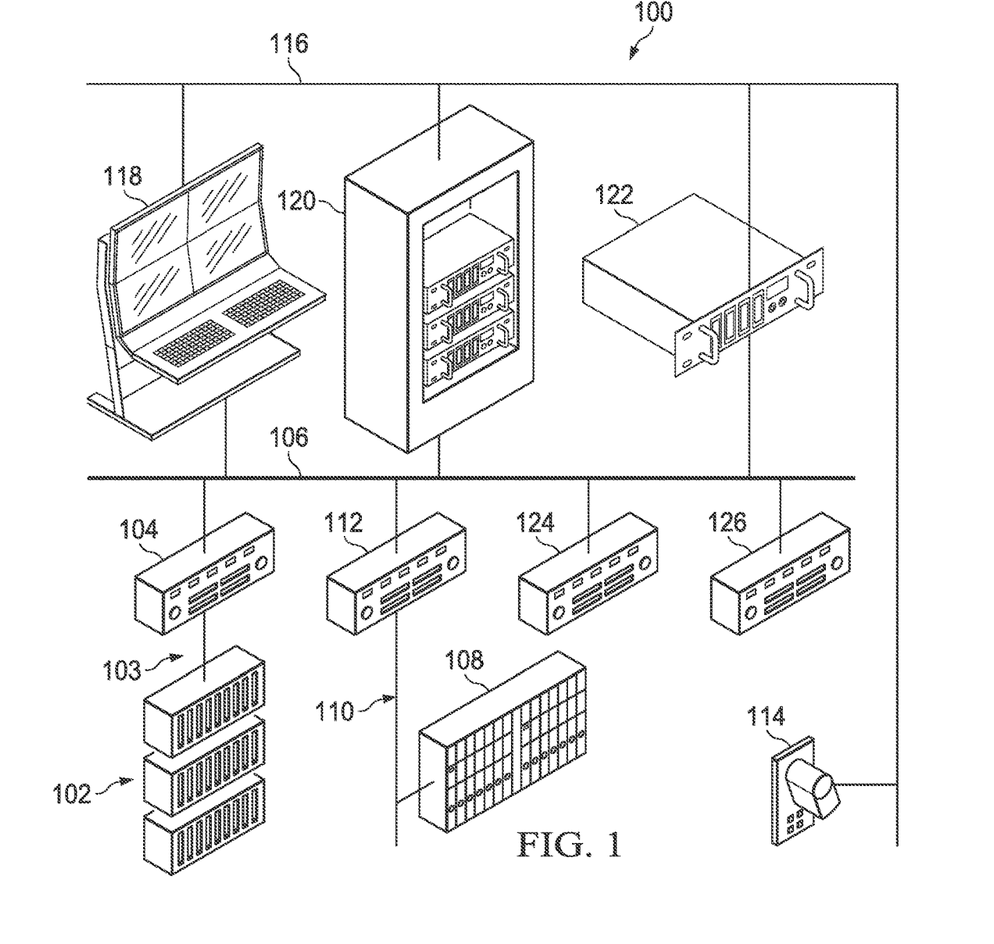
FIG. 1 illustrates an example industrial process control and automation system having legacy and modern control systems according to this disclosure.

FIG. 1 illustrates an example industrial process control and automation system 100 having legacy and modern control systems according to this disclosure. As shown in FIG. 1, the system 100 includes one or more legacy controllers 102, which are often said to reside within or form a part of a "Level 1" controller network in a control and automation system. Each legacy controller 102 is capable of controlling one or more characteristics in an industrial process system. A process system generally represents any system or portion thereof configured to process one or more products or other materials in some manner. For instance, the legacy controllers 102 could receive measurements from one or more sensors and use the measurements to control one or more actuators. Each legacy controller 102 represents an older, less technologically advanced, less feature-rich, or otherwise less advanced process controller in the system 100.

The legacy controllers 102 communicate via a legacy network 103 with at least one legacy gateway 104. The legacy network 103 represents one or more communication paths that support interactions with the legacy controllers 102 using a legacy protocol. In some embodiments, the legacy network 103 could represent a coaxial network, such as a HIWAY network from HONEYWELL INTERNATIONAL INC. However, the legacy network 103 could represent any other suitable legacy industrial process control network.

The legacy controllers 102 communicate with higher-level devices and systems via the legacy gateway(s) 104. In this example, each legacy gateway 104 facilitates communication between the legacy network 103 and at least one local control network (LCN) 106. Each legacy gateway 104 includes any suitable structure facilitating communication with one or more controllers via an LCN. The LCN 106 represents a network facilitating communication among higher-level process control and automation devices and systems.

In particular embodiments, the legacy controllers 102 represent TDC3000 control system devices from HONEYWELL INTERNATIONAL INC. These types of devices routinely communicate over a "data hiway," which uses the HIWAY protocol supported by the legacy gateway 104. The legacy gateway 104 converts between that protocol and the protocol used by the LCN 106.

In this example, the system 100 also includes other types of process controllers. For example, at least one process manager 108 can communicate over a universal control network (UCN) 110. The process manager 108 could represent an older process controller in the system 100. The process manager 108 represents any suitable controller, such as a high-performance process manager (HPM) from HONEYWELL INTERNATIONAL INC. A gateway 112 facilitates communication between the LCN 106 and the UCN 110. The gateway 112 includes any suitable structure facilitating communication between networks, such as a NETWORK INTERFACE MODULE (NIM) from HONEYWELL INTERNATIONAL INC.

The system 100 also includes one or more advanced controllers 114 that communicate over an advanced control network 116. The advanced controllers 114 represent controllers that are newer, more technologically advanced, more feature-rich, or otherwise more advanced than the legacy controllers 102. Similarly, the control network 116 could represent a newer, more technologically advanced, more feature-rich, or otherwise more advanced network for transporting control information, such as an Internet Protocol (IP)-based network. In particular embodiments, the advanced controllers 114 could represent C300 controllers from HONEYWELL INTERNATIONAL INC., and the control network 116 could represent a FAULT TOLERANT ETHERNET (FTE) network from HONEYWELL INTERNATIONAL INC. or other redundant IP-based network.

Various other components in the system 100 support a wide range of process control and automation-related functions. For example, one or more operator stations 118 can be used by one or more operators to interact with the system 100. At least one supervisory controller 120 and at least one server 122 provide higher-level control in the system 100. For instance, the supervisory controller 120 and/or server 122 could perform more advanced planning or scheduling operations, execute higher-level control strategies, or perform other functions. At least one application platform 124 can be used to automate various procedures in the system 100. At least one historian 126 can be used to collect and store data associated with operation of the system 100 over time. At least some of the components 118-126 are often said to reside within or form a part of a "Level 2" LCN network in a control and automation system.

Each operator station 118 includes any suitable structure for facilitating operator interactions, such as an EXPERION STATION-TPS (ES-T) from HONEYWELL INTERNATIONAL INC. Each controller 120 includes any suitable structure for providing supervisory control, such as an Application Control Environment-TPS (ACE-T) node from HONEYWELL INTERNATIONAL INC. Each server 122 represents any suitable computing device, such as an EXPERION SERVER TPS from HONEYWELL INTERNATIONAL INC. (or a redundant pair of such servers). Each application platform 124 includes any suitable structure for executing automated procedures, such as an APPLICATION MODULE (AM) from HONEYWELL INTERNATIONAL INC. Each historian 126 includes any suitable structure for storing data, such as a HISTORY MODULE (HM) from HONEYWELL INTERNATIONAL INC.

As described in more detail below, the operator station 118 or other component of the system 100 supports the use of a common user interface that provides unified status and alarm management for operations, monitoring, and maintenance of legacy and modern control systems. In FIG. 1, for example, the common user interface could be used to provide status and alarm management related to operations of the legacy controllers 102 and the advanced controllers 114.

Although FIG. 1 illustrates one example of an industrial process control and automation system 100 having legacy and modern control systems, various changes may be made to FIG. 1. For example, various components in FIG. 1 could be combined, further subdivided, moved, or omitted and additional components could be added according to particular needs. Also, the system 100 could include any number of each component shown in FIG. 1. Control and automation systems come in a wide variety of configurations, and FIG. 1 does not limit the scope of this disclosure to any particular configuration. Further, the components 118-122 shown in FIG. 1 are only examples of the types of higher-level components that might be present in a system and interact with legacy controllers 102 and advanced controllers 114. Other or additional higher-level components could also be used. In addition, FIG. 1 is meant to illustrate one example operational environment in which unified status and alarm management for operations, monitoring, and maintenance of legacy and modern control systems from a common user interface can be provided. This functionality could be used in any other suitable system and with any suitable legacy and modern control system components.

Figure 2:
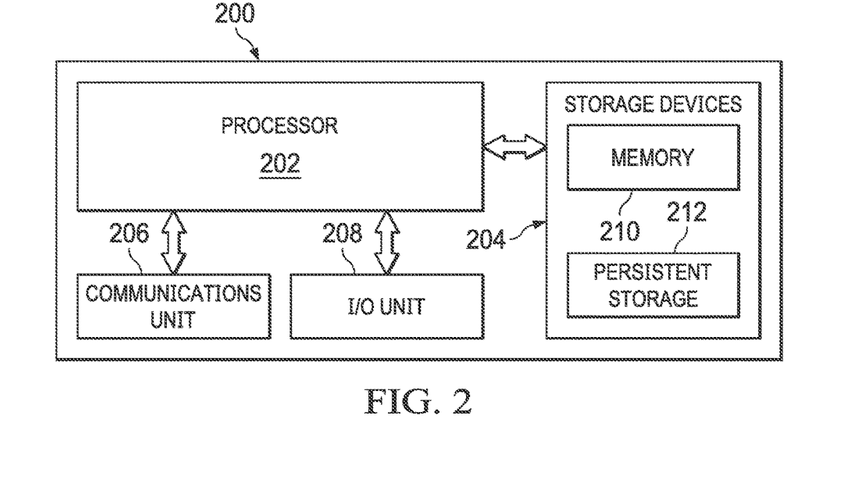
FIG. 2 illustrates an example device supporting unified status and alarm management for operations, monitoring, and maintenance of legacy and modern control systems from a common user interface according to this disclosure.

FIG. 2 illustrates an example device 200 supporting unified status and alarm management for operations, monitoring, and maintenance of legacy and modern control systems from a common user interface according to this disclosure. The device 200 could, for example, denote an operator station 118 or other higher-level components in the system 100 of FIG. 1. However, the device 200 could be used in any other suitable system, and a user interface supporting unified status and alarm management could be generated or used by any other suitable device.

As shown in FIG. 2, the device 200 includes at least one processor 202, at least one storage device 204, at least one communications unit 206, and at least one input/output (I/O) unit 208. Each processor 202 can execute instructions, such as those that may be loaded into a memory 210. The instructions could be used to generate or display a user interface supporting unified status and alarm management. Each processor 202 includes any suitable processing device, such as one or more microprocessors, microcontrollers, digital signal processors, application specific integrated circuits (ASICs), field programmable gate arrays (FPGAs), or discrete circuitry.

The memory 210 and a persistent storage 212 are examples of storage devices 204, which represent any structure(s) capable of storing and facilitating retrieval of information (such as data, program code, and/or other suitable information on a temporary or permanent basis). The memory 210 may represent a random access memory or any other suitable volatile or non-volatile storage device(s). The persistent storage 212 may contain one or more components or devices supporting longer-term storage of data, such as a read only memory, hard drive, Flash memory, or optical disc.

The communications unit 206 supports communications with other systems or devices. For example, the communications unit 206 could include a network interface card or a wireless transceiver facilitating communications over a wired or wireless network. The communications unit 206 may support communications through any suitable physical or wireless communication link(s).

The I/O unit 208 allows for input and output of data. For example, the I/O unit 208 may provide a connection for user input through a keyboard, mouse, keypad, touchscreen, or other suitable input device. The I/O unit 208 may also send output to a display, printer, or other suitable output device.

In some embodiments, the device 200 shown in FIG. 2 forms part of an operator station 118. In these embodiments, the one or more processors 202 can generate graphical displays (such as human-machine interface or "HMI" displays) for presentation on one or more display screens of the operator station 118. A suitable I/O unit 208 can be used to support the presentation of the graphical displays on the one or more display screens of the operator station 118.

In other embodiments, the device 200 shown in FIG. 2 represents a device separate from an operator station 118. For example, the device 200 could represent a server 122 shown in FIG. 1 that communicates with one or more operator stations 118 over one or more networks 106 and 116. In those embodiments, the one or more processors 202 can generate HMI or other graphical displays, and data defining the graphical displays can be transmitted to an operator station 118, mobile device, or other device, such as via a suitable communications unit 206. A communications unit of the operator station 118, mobile device, or other device receives the data, and one or more processors of the operator station 118, mobile device, or other device process the data and present the graphical displays on one or more display screens.

However the functionality is implemented, the graphical displays presented on one or more operator stations 118 can include a common user interface that provides unified status and alarm management for operations, monitoring, and maintenance of legacy and modern control systems. The information used to generate the common user interface and other graphical displays could be received directly from one or more sources (such as the controllers 102 and 114). The information used to generate the common user interface and the other graphical displays could also or alternatively be received indirectly from one or more sources, such as via the historian 126.

Although FIG. 2 illustrates one example of a device 200 supporting unified status and alarm management for operations, monitoring, and maintenance of legacy and modern control systems from a common user interface, various changes may be made to FIG. 2. For example, components could be added, omitted, combined, further subdivided, or placed in any other suitable configuration according to particular needs. Also, computing devices can come in a wide variety of configurations, and FIG. 2 does not limit this disclosure to any particular configuration of computing device.

Figure 3A:
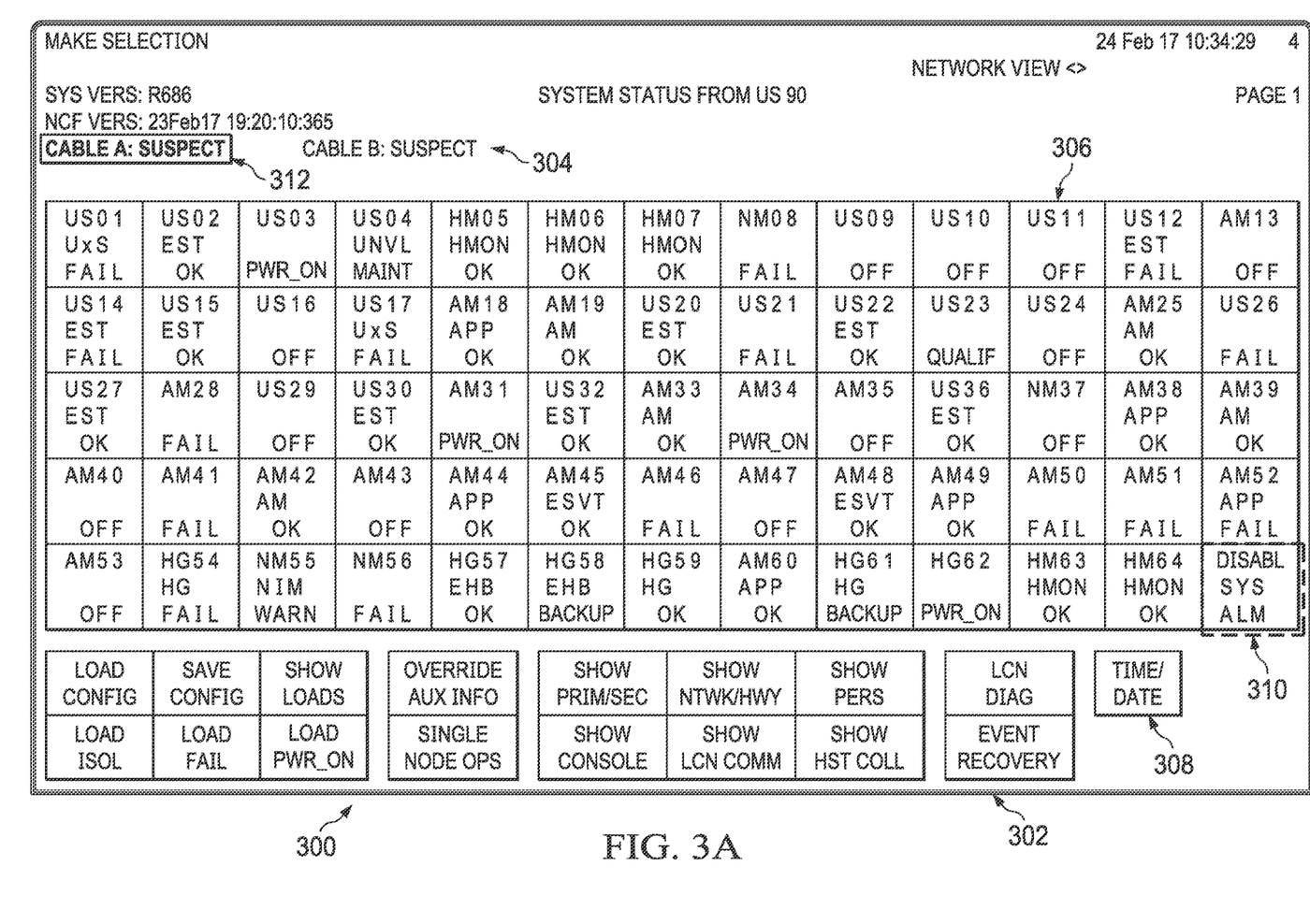
FIGS. 3A and 3B illustrate an example legacy user interface according to this disclosure.
Figure 3B:
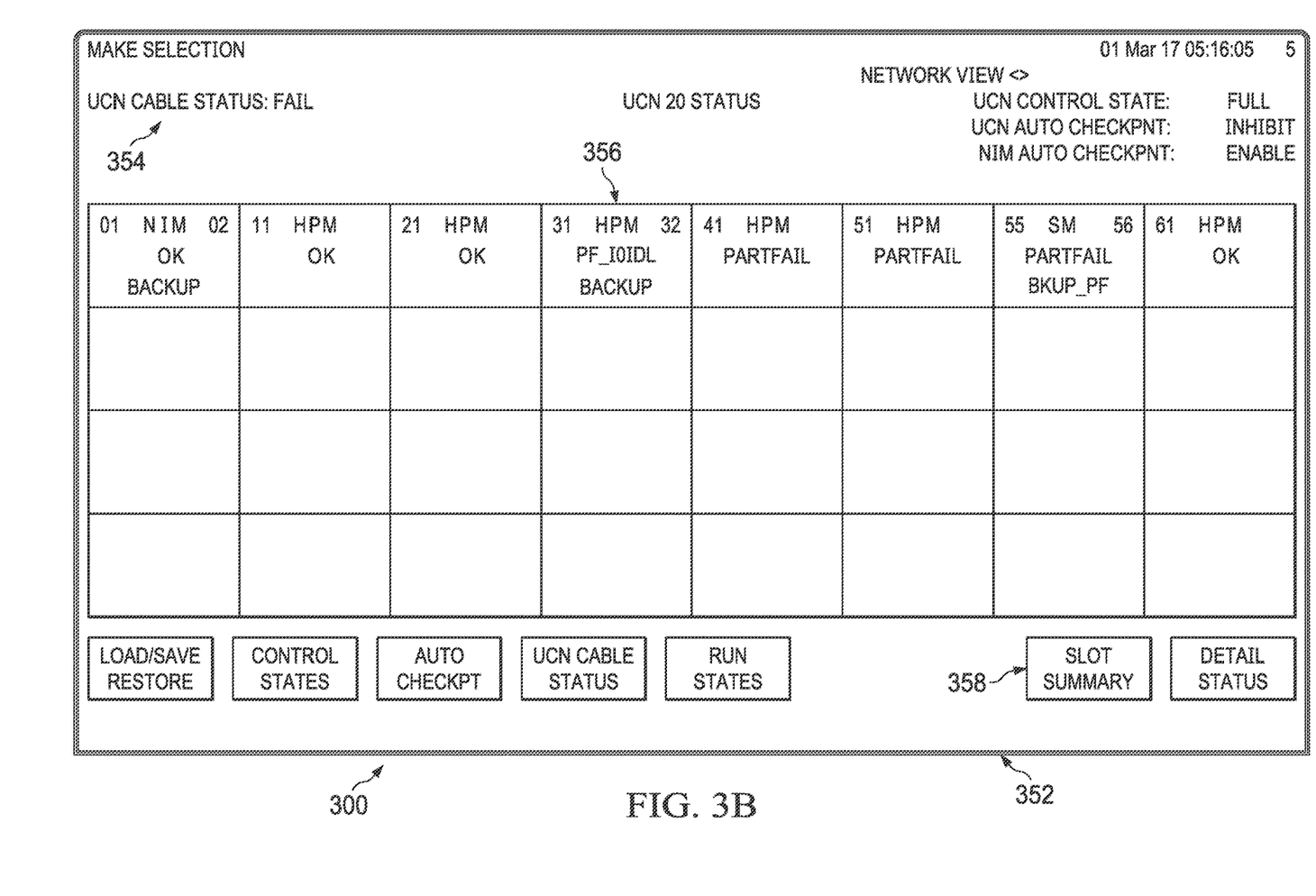

FIGS. 3A and 3B illustrate an example legacy user interface 300 according to this disclosure. In this particular example, the legacy user interface 300 is associated with TDC3000 legacy control system components, and the legacy user interface 300 is used (among other things) to identify status and system alarm information associated with the TDC3000 control system components. However, other legacy control system components could be used, and it is expected that today's "modern" control system components will be "legacy" control system components at some point in the future.

As shown in FIGS. 3A and 3B, the legacy user interface 300 includes a status display 302 associated with a legacy control system. The status display 302 includes several lines of text 304, which provide general information about a particular system or device selected by a user. The status display 302 also includes various information boxes 306, which identify different statuses or alarms associated with the particular system or device selected by the user. Each system alarm associated with the particular system or device selected by the user is presented as part of the status display 302 within one of the information boxes 306. In addition, the status display 302 includes various function boxes 308, which are associated with different functions that can be initiated by the user.

The user can navigate within the status display 302 using up, down, left, and right moves, such as by using arrow keys on a keyboard. To identify the currently-selected box within the status display 302, a border 310 of the currently-selected box could be brighter, thicker, or otherwise identified. Highlighting 312 can also be used to identify important information for the user.

Obtaining information about a specific status or system alarm requires a user to select a portion of the status display 302 (namely a specific information box 306) and then select the appropriate command (namely a specific function box 308) in order to view a second display 352 with additional information about the status or system alarm. The display 352 here includes several lines of text 354, which provide general information about the selected status or system alarm. The display 352 also includes various information boxes 356, which identify information about different components (and possible causes) associated with the selected status or system alarm. In addition, the display 352 includes various function boxes 358, which are associated with different functions that can be initiated by the user. Again, the user could navigate within the display 352 using up, down, left, and right moves. Although not shown here, a border of a currently-selected box could be identified, such as by using brighter, thicker, or other lines. Highlighting can be used to identify important information for the user.

As can be seen in FIGS. 3A and 3B, the legacy user interface 300 has a poor graphical resolution. Also, obtaining information about a specific status or alarm requires user navigation within one display 302 and user review of a different display 352. As a result, the user interface 300 is not intuitive to use and is less user friendly, and in some cases navigation through a complex hierarchy of displays may be required in order to obtain desired information. In addition, the user interface 300 can be more difficult to navigate, particularly for younger or less-experienced personnel.

Although FIGS. 3A and 3B illustrate one example of a legacy user interface 300, various changes may be made to FIGS. 3A and 3B. For example, other legacy user interfaces exist and could be used in an industrial process control and automation system. The specific legacy user interface 300 shown in FIGS. 3A and 3B is merely meant to illustrate examples of the types of shortcomings that exist in the user interfaces of legacy control systems.

Figure 4A:
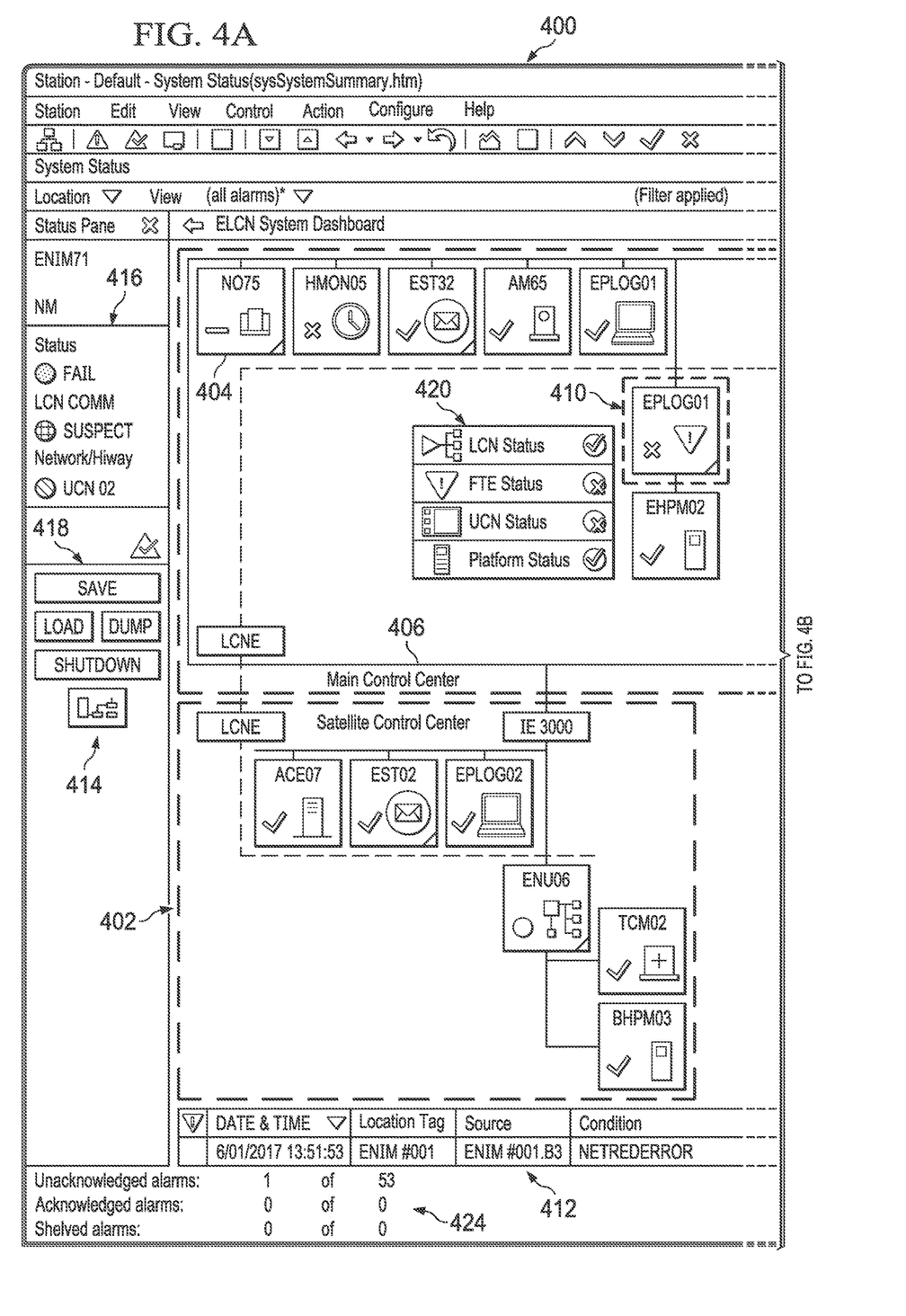
FIGS. 4A and 4B illustrate an example common user interface supporting unified status and alarm management for operations, monitoring, and maintenance of legacy and modern control systems according to this disclosure.
Figure 4B:
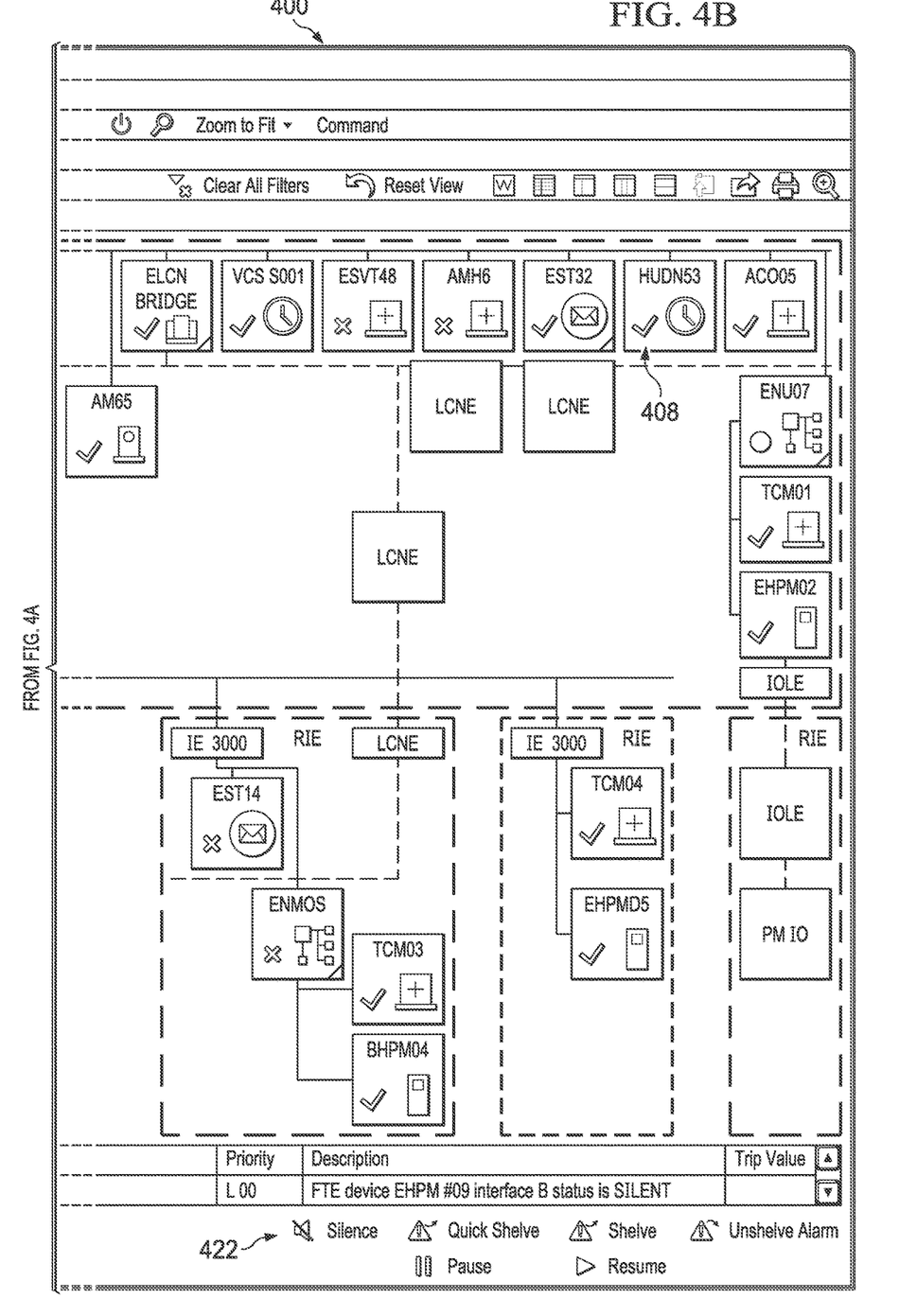

FIGS. 4A and 4B illustrate an example common user interface 400 supporting unified status and alarm management for operations, monitoring, and maintenance of legacy and modern control systems according to this disclosure. In this particular example, the user interface 400 is associated with EXPERION PKS control system components and can be used to present status and alarm information associated with those components and with TDC3000 legacy control system components. However, other legacy and modern control system components could be used, and it is expected that today's "modern" control system components will be "legacy" control system components at some point in the future.

As shown in FIGS. 4A and 4B, the user interface 400 can include at least one graphical representation 402 of at least part of a control system or an underlying industrial process that is managed or controlled using the control system. The control system illustrated in the graphical representation 402 can include one or more modern control system components and optionally one or more legacy control system components. The control system components could represent controllers, gateways, sensors, actuators, or any other or additional components in a control system or an underlying industrial process. Each control system component can be identified using a thumbnail image 404, and lines 406 represent network connections among the control system components. The thumbnail images 404 and network lines 406 can graphically represent the setup of at least part of a control environment for an industrial facility or portion thereof.

Alarms associated with process controllers or other control system components could be presented in any suitable manner within the user interface 400, such as by using icons 408 in the graphical representation 402. For example, each image 404 can include an icon 408 indicating whether the control system component associated with that image 404 is operating acceptably or is experiencing any alarms. As particular examples, a green checkmark icon 408 can indicate that the associated control system component is operating acceptably, while a red "X" icon 408 can indicate that the associated control system component is experiencing at least one alarm. Of course, any other or additional icons 408 could be used here to identify whether control system components are experiencing any alarms.

The user interface 400 allows different functions to be invoked or options to be selected using more modern input/output mechanisms (such as drop-down menus and mouse right-clicks). For example, a user could use a mouse to click on an image 404 or its icon 408 or use another input device to select an image 404 or its icon 408 in order to view information about the status of the associated control system component. A border 410 of the currently-selected image 404 could be shown in a different color (such as blue instead of gray), brighter, thicker, or otherwise identified.

When an image 404 or its icon 408 is selected by a user, the user interface 400 in this example identifies any alarms being experienced by the associated control system component in a list 412. The list 412 identifies each alarm and details about that alarm. In this example, the list 412 includes fields for identifying a date and time of an alarm, a location tag associated with the alarm, and a source of the alarm. The list 412 also includes fields for a condition associated with the alarm, a priority of the alarm, and a description of the alarm. If the alarm was triggered by a process variable rising above or falling below a trip value, the list 412 can further include a field identifying the trip value. Of course, other or additional values could also be presented, and not all fields need to be occupied in the list 412 for each alarm.

When an image 404 or its icon 408 is selected by a user, the user interface 400 in this example can also present a status pane 414 for the associated control system component. The status pane 414 includes one or more indicators 416 identifying the status of various aspects of the associated control system component. In this particular example, the indicators 416 identify the overall status of the control system component and its LCN and UCN statuses, although other or additional aspects of the control system component could be identified. The status pane 414 also includes controls 418 allowing a user to invoke certain functions involving the associated control system component. In this example, the functions include saving a device configuration for the control system component to a local file, loading a new or updated device configuration onto the control system component, dumping an existing device configuration from the control system component, and shutting down the control system component. Of course, any other or additional functions could be invoked here.

A user could also right-click on an image 404 or its icon 408 to view a pop-up window 420 for the associated control system component. The pop-up window 420 identifies different status values for the associated control system component. These status values can be used to identify why a control system component is experiencing an alarm (if any). In this example, the pop-up window 420 identifies the LCN status, UCN status, FTE status, and platform status of the associated control system component. These status values can identify if there is a problem involving a network (LCN, UCN, or FTE) coupled to the control system component or a problem involving the control system component's equipment itself (platform). Of course, any other or additional status information could be provided in the pop-up window 420 here.

As a particular example of how the graphical user interface 400 can be used, assume that the graphical representation 402 of the legacy and modern control system components identifies at least one hybrid control system component. As noted above, a hybrid control system component or hybrid node is one having multiple views. A hybrid control system component is often implemented using more modern hardware that executes both modern control software and legacy control software. If the hybrid control system component is selected in the graphical representation 402, the list 412 can be used to identify the status and alarms for all views supported by the hybrid control system component. If the hybrid control system component is a dual-view node (such as when it supports a TDC3000 view and an EXPERION PKS view), the list 412 can identify the status and alarms for both views.

Since the graphical representation 402 of the control system can include both modern and legacy control system components, the user interface 400 can be used by one or more users to quickly identify alarms involving the modern and legacy control system components. Any of the alarms identified in the user interface 400 (including the legacy alarms) could be selected by a user, such as when the user uses a mouse to click on an alarm in the list 412. The user could select a particular alarm in order to view details about that alarm or trigger a function associated with the alarm. Example functions could include acknowledging an alarm, shelving an alarm, or filtering an alarm. Controls 422 can be provided in the user interface 400 that allow a user to trigger these or other functions for at least one selected alarm in the list 412. Among other things, this allows users to perform or invoke system alarm management tasks on system events that are embedded within a complex hierarchy of legacy system displays, without requiring changes to management of legacy system events. A summary 424 can also be provided to identify the number of acknowledged, unacknowledged, and shelved alarms associated with the control system components represented in the graphical representation 402 (including the legacy alarms). It should be noted that legacy alarms can also be acknowledged in a legacy interface (such as the user interface 300), and the acknowledgement can be visible in the user interface 400 (such as in the list 412 and the summary 424). Further, it should be noted that some acknowledgements can be auto-generated, such as when the state of a control system component transitions from a failed state or other state requiring an acknowledgement to a normal state (so a user acknowledgement is no longer needed).

The user interface 400 in FIGS. 4A and 4B could be generated by any suitable component, such as an operator station 118 or server 122. The user interface 400 in FIGS. 4A and 4B could also be presented using any suitable component, such as an operator station 118 or a user's mobile device.

As can be seen here, the user interface 400 of FIGS. 4A and 4B has better graphical resolution and is easier to navigate compared to the legacy user interface 300 of FIGS. 3A and 3B. Also, obtaining information about a specific alarm simply involves the user selecting a control system component in the graphical representation 402, such as to view its alarms in the list 412 or its status in the status pane 414 or pop-up window 420. The user interface 400 is therefore very intuitive to use and is extremely user friendly, and information about alarms can be easily obtained. Further, advanced functions such as alarm acknowledgement, alarm shelving, and alarm filtering can be easily invoked (even for legacy control system alarms). In addition, the user interface 400 can be easily understood and used by younger or less-experienced personnel who may have little or no understanding of legacy control system components.

Although FIGS. 4A and 4B illustrate one example of a common user interface 400 supporting unified status and alarm management for operations, monitoring, and maintenance of legacy and modern control systems, various changes may be made to FIGS. 4A and 4B. For example, other modern user interfaces exist and could be supplemented with legacy alarms in an industrial process control and automation system.

Figure 5:
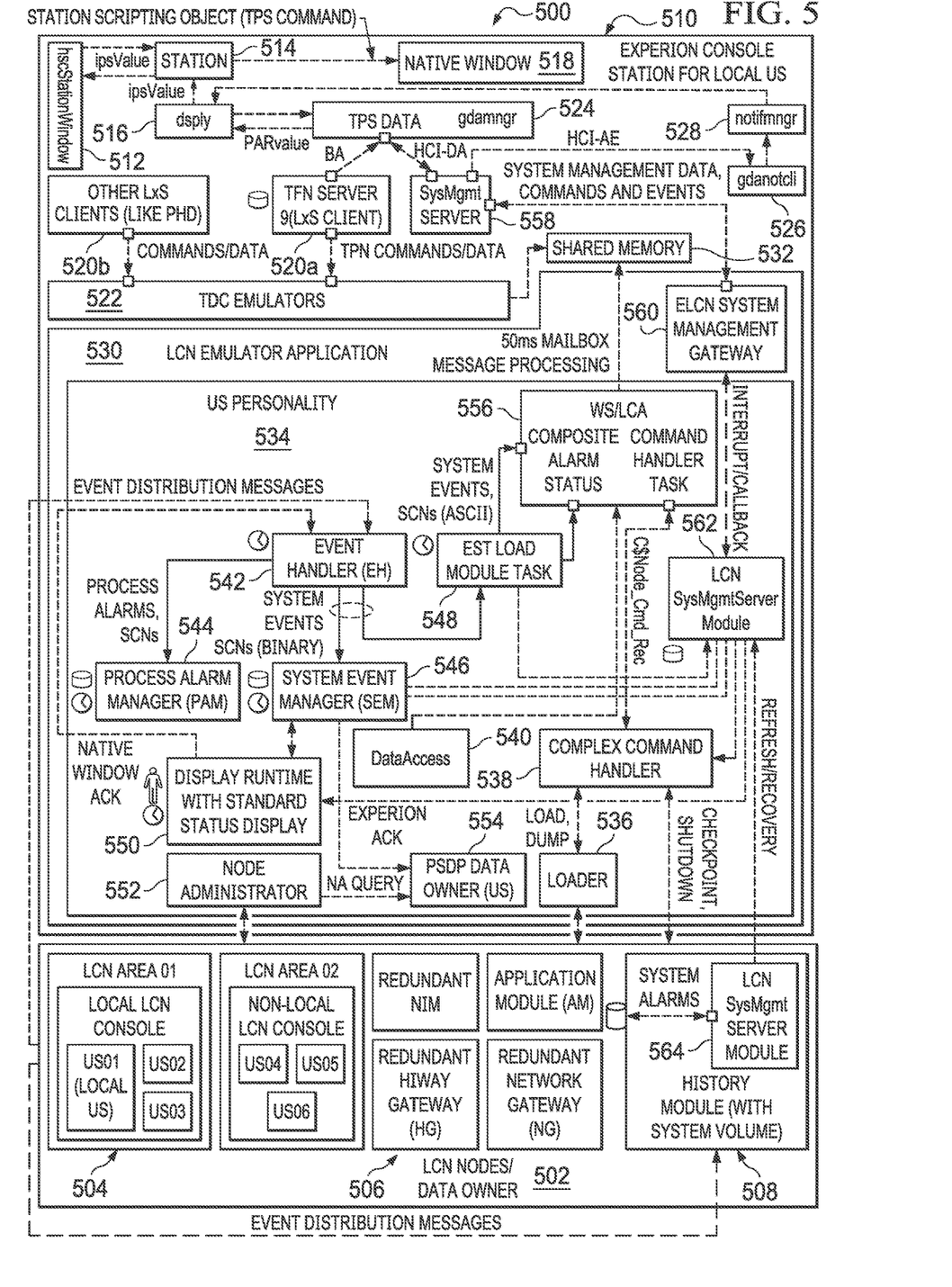
FIG. 5 illustrates an example component model supporting unified status and alarm management for operations, monitoring, and maintenance of legacy and modern control systems from a common user interface according to this disclosure.

FIG. 5 illustrates an example component model 500 supporting unified status and alarm management for operations, monitoring, and maintenance of legacy and modern control systems from a common user interface according to this disclosure. For ease of explanation, the component model 500 is described as being implemented using the device 200 of FIG. 2 in the system 100 of FIG. 1. However, the component model 500 could be used by any other suitable device(s) and in any other suitable system(s).

The component model 500 shown in FIG. 5 is used to support the conversion of legacy system status behavior attributes associated with state change notifications into modern alarms with standard alarm transitions. The modern alarms could include various states (such as IN ALARM and RETURN TO NORMAL) along with defined transitions between those states. For example, modern control systems can often issue an alarm when an abnormal condition is detected and later issue another alarm when the abnormal condition is resolved (meaning the condition has "returned to normal"). The modern alarms also typically have details such as descriptions, times of occurrence, and alarm priorities.

As shown in FIG. 5, the component model 500 includes or interacts with one or more data sources 502, which generally provide legacy state change notifications or events. In this example, the data sources 502 include one or more LCN consoles 504, one or more network devices 506, and/or one or more process historians 508. The network devices 506 in this example include redundant NIMs, redundant HIWAY gateways, redundant network gateways, and an AM. Of course, any other or additional components could be used as the network devices 506.

The legacy state change notifications or events can be broadcasted on the network 106 and can be received by an operator station 118 or other device that implements a console station 510. In this example, the console station 510 represents an EXPERION console station, although other devices could be used to receive and process the legacy state change notifications or events. The console station 510 of the component model 500 here includes an existing T-Node infrastructure, which could include various components with little or no modifications. These components include an HMIWEB station and display builder 512, a station component 514, a display component 516, and a native window component 518, which are used to generate and present HMI or other graphical displays for users. These components also include various LxS clients 520a-520b, which are used for data transfers involving the component model 500. These components further include one or more Total Distributed Control (TDC) emulators 522, which can be used to emulate older TDC technology from HONEYWELL INTERNATIONAL INC. In addition, these components include a General Database Access (GDA) manager 524, a GDA notification client 526, and a notification manger 528, which are used to support access and use of information in a database. These components are common features of the EXPERION STATION-TPS software suite from HONEYWELL INTERNATIONAL INC.

The emulators 522 communicate with an LCN emulator application 530 through a shared memory 532. The shared memory 532 represents any suitable memory that can be accessed by multiple components of the component model 500. The LCN emulator application 530 executes an LCN personality, such as under 68K emulation, to emulate the behavior of a legacy LCN device. Of course, other types of network emulations could be used here. The LCN emulator application 530 allows an operator station 118 or other non-LCN device to appear as an LCN device during communications with other LCN devices. This may be needed, for example, if the operator station 118 or other non-LCN device executes a WINDOWS-based operating system and is not designed to appear as an LCN device. As part of the LCN emulation, the LCN emulator application 530 supports a UNIVERSAL STATION (US) personality 534. The UNIVERSAL STATION technology is an older HONEYWELL technology used to interact with TDC3000 devices or other legacy control system components. By executing the US personality 534, the LCN emulator application 530 allows for interactions with legacy control system components.

The US personality 534 here includes various existing components common to an EXPERION installation. These components include a loader 536, which can be used to load data onto and dump data from one or more data sources 502. A complex command handler 538 enables workflow management to support checkpoint functions, shutdown functions, or other functions. A data access component 540 facilitates data storage and retrieval operations involving one or more data sources 502. An event handler 542 receives event distribution messages from one or more data sources 502 and provides the event distribution messages to suitable destinations, which can be based on the types of events detected. In this example, the suitable destinations include a process alarm manager 544, a system event manager 546, and an ES-T load module task 548, and these components can perform various functions to manage, store, or otherwise process events. A display component 550 can be used to generate graphical displays for a user, such as to present status information and receive acknowledgements from the user. A node administrator 552 supports the receipt of data access requests from a user. A processor status data point (PSDP) data owner 554 contains a number of parameters related to the emulated LCN device, such as performance status and memory use values. A workstation (WS)/LCN communications adapter (LCA) 556 supports interactions with the US personality 534 by reading data from and writing data to the shared memory 532. Again, these components are common features of the EXPERION STATION-TPS software suite from HONEYWELL INTERNATIONAL INC.

To support the presentation and management of alarms related to legacy control system components in a modern graphical user interface, the component model 500 includes a system management (SYSMGMT) server 558 and an EXPERION LCN (ELCN) system management gateway 560. The system management server 558 is a control infrastructure server configured for data and alarm/event access from an ELCN node or other node. In some embodiments, the system management server 558 could run only on ELCN ES-T nodes. The system management server 558 supports a local connection for the GDA manager 524 and a remote connection for enabling the GDA manager running on EXPERION STATION-TPS server (ESVT) nodes to access data. This allows the system management server 558 to receive and store various system management data, commands, and events associated with legacy control system components and to make this information available for use in generating a modern graphical user interface containing alarms related to legacy control system components.

The ELCN system management gateway 560 is used to enable communications between legacy LCN software and the system management server 558. This allows the system management data, commands, and events to be passed to the system management server 558 for storage or use. In some embodiments, an interrupt/command mechanism can be used to interact with the US personality 534 running under the emulation process in order to send data access (DA) requests, commands, and acknowledgements from the EXPERION side to the Total Plant Network (TPN) side. In particular embodiments, the emulation application 530 can have access to the personality memory, allowing it to directly read a system event manager (SEM) database without having to go through the personality. The location of the SEM database can be made known to the emulation application 530 at ES-T node start-up.

An LCN system management server module 562 can be used in the US personality 534, and an LCN system management server module 564 can be used in one or more data sources 502 (such as a process historian 508). The server module 562 interacts with the ELCN system management gateway 560 directly, such as via an interrupt/callback mechanism. The server module 564 archives system alarms derived from the state change notifications in a file, which is used for system alarm recovery purposes. The server module 564 interacts with the ELCN system management gateway 560 indirectly through the server module 562 to support recovery and refresh of alarm states from legacy control systems to modern control systems. The LCN system management server module 562 can receive information such as commands and acknowledgements from the system event manager 546, and the LCN system management server module 564 can re-route LCN parameter access requests (for PSDP and box parameters) to the DA subsystem of the console station 510.

In some embodiments, all of the components in the console station 510 could be implemented using software that is executed by the processor(s) of the device 200. As noted above, in particular embodiments, all of the components in the console station 510 can be implemented within the EXPERION STATION-TPS software suite from HONEYWELL INTERNATIONAL INC. Modifications can be made to the ES-T software suite to allow the generation of modern graphical user interfaces supporting the presentation and management of alarms related to legacy control system components.

In the example component model 500 shown in FIG. 5, a device could execute software that passes state change events from the US personality 534 (typically implemented using software) to the ELCN system management gateway 560 (also typically implemented using software), such as via a special "processor-emulation-trap-out-mechanism". In some embodiments, this data exchange (which could occur between LCN and WINDOWS applications) does not use standard LxS channel mechanisms, which may be the only mechanism available on non-ELCN nodes.

In some embodiments, the ELCN system management gateway 560 applies a state machine rule for a node type corresponding to each state change event. For example, the ELCN system management gateway 560 can apply a UCN node state machine rule if the state change event is reported by an HPM to determine the alarm or return to normal (RTN) condition. The ELCN system management gateway 560 can also cache legacy system alarm states in order to enable refreshes and recoveries from legacy control systems to modern control systems. Support here is provided for bi-directional management of changes in system states, thereby providing a choice for users to use either a legacy user interface or a modern user interface without having any synchronization problems. This enables system alarm acknowledgement, alarm shelving, and filtering features for the legacy control system alarms.

In particular embodiments, the component model 500 could be deployed using an existing ELCN infrastructure. After migrating from an LCN to an ELCN, a system management dashboard can be automatically created for an underlying TDC3000 system. System alarm reporting and management capabilities can be embedded in the system management dashboard itself. Any TDC3000 system alarms can also or alternatively be monitored and managed from an EXPERION station's system alarm display. As a result, the legacy software has a new software subsystem that its system events subsystem can interact with, and event data can be extracted without impacting any legacy event functionalities. When the first LCN ES-T or LCN history module is migrated to ELCN, an LCN system status journal is used to obtain an outstanding alarm list, which can be derived from state change notifications in the legacy control system. The outstanding alarm list can be used to build an alarm list during the migration from the LCN to the ELCN. Any ES-Ts migrated subsequently can recover the alarm list from the ELCN history module.

Although FIG. 5 illustrates one example of a component model 500 supporting unified status and alarm management for operations, monitoring, and maintenance of legacy and modern control systems from a common user interface, various changes may be made to FIG. 5. For example, the component model 500 shown here relates to a specific implementation involving TDC3000 and EXPERION control systems, and other component models could be implemented with any suitable components to facilitate communications between any suitable legacy and modern control systems.

Figure 6:
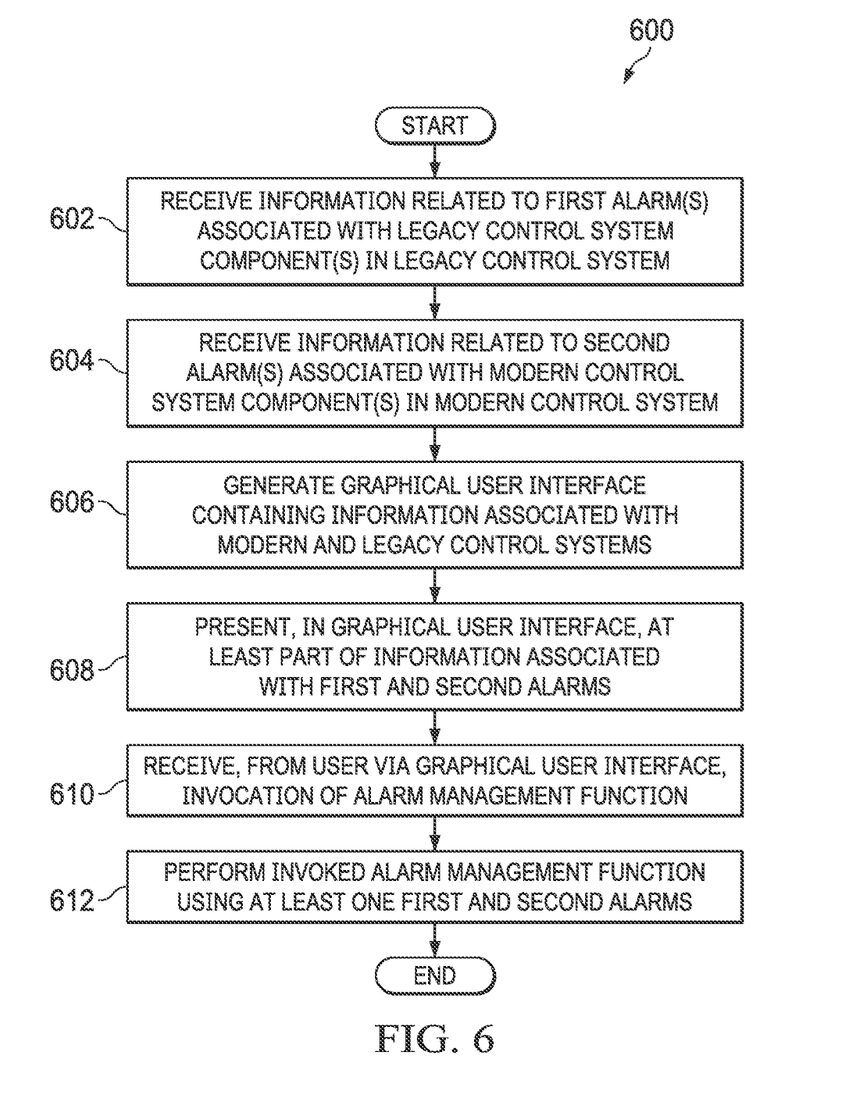
FIG. 6 illustrates an example method for providing unified status and alarm management for operations, monitoring, and maintenance of legacy and modern control systems from a common user interface according to this disclosure.

FIG. 6 illustrates an example method 600 for providing unified status and alarm management for operations, monitoring, and maintenance of legacy and modern control systems from a common user interface according to this disclosure. For ease of explanation, the method 600 is described as being performed using the device 200 of FIG. 2 in the system 100 of FIG. 1. However, the method 600 could be performed by any other suitable device(s) and in any other suitable system(s).

As shown in FIG. 6, information related to one or more first alarms associated with one or more legacy control system components in a legacy control system is received at step 602. This could include, for example, the processor 202 of the device 200 receiving data defining legacy state change notifications or events associated with the legacy control system components and associating those events with more modern alarms with standard alarm transitions. Information related to one or more second alarms associated with one or more modern control system components in a modern control system could be received at step 604. This could include, for example, the processor 202 of the device 200 receiving data defining alarm transitions associated with the modern control system components.

A graphical user interface containing information about the modern and legacy control systems is generated at step 606. This could include, for example, the processor 202 of the device 200 generating the common user interface 400. The user interface 400 can include a graphical representation 402 of legacy and modern control system components, such as by including thumbnail images 404 and network lines 406. Each thumbnail image 404 could include an icon 408 indicating whether one or more alarms are associated with the modern or legacy control system component represented by the thumbnail image 404.

At least some of the information associated with the first and second alarms is presented in the graphical user interface at step 608. This could include, for example, the processor 202 of the device 200 detecting a user selecting a specific one of the thumbnail images 404 or an icon 408 of that thumbnail image 404. This could also include the processor 202 of the device 200 presenting a list 412 that identifies each alarm and details about each alarm associated with the control system component related to the selected thumbnail image 404 or icon 408.

An invocation of an alarm management function is received from the user via the graphical user interface at step 610, and the invoked alarm management function is performed using at least one of the first and second alarms at step 612. This could include, for example, the processor 202 of the device 200 detecting that the user has selected one of the controls 422 in the user interface 400. This could also include the processor 202 of the device 200 acknowledging, shelving, or filtering at least one of the alarms in the list 412 based on the invoked function and any alarms selected by the user in the list 412.

Although FIG. 6 illustrates one example of a method 600 for providing unified status and alarm management for operations, monitoring, and maintenance of legacy and modern control systems from a common user interface, various changes may be made to FIG. 6. For example, while shown as a series of steps, various steps in FIG. 6 could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
receiving an electronic communication that includes information associated with one or more first alarms of a legacy control system, wherein the legacy control system includes at least one legacy controller;
generating a graphical user interface containing information associated with a second control system and the legacy control system, wherein the second control system includes at least one controller, and wherein the second control system supports one or more alarm management functions that are not supported by the legacy control system;
presenting, in the graphical user interface, at least a portion of the information associated with the one or more first alarms of the legacy control system;
receiving, from a user via the graphical user interface, an invocation of an alarm management function not supported by the legacy control system, the invocation further supporting one or more functions associated to the second control system, including at least one of:
saving a device configuration for the second control system to a local file,
loading a new or updated device configuration onto the second control system,
dumping an existing device configuration from the second control system, and
shutting down the second control system; and
performing the invoked alarm management function using at least one of the one or more first alarms of the legacy control system and the one or more functions.

2. The method of claim 1, wherein the graphical user interface comprises:
a graphical representation of control system components in at least one of the legacy control system and the second control system; and
a list identifying any alarms associated with a selected control system component selected in the graphical representation.

3. The method of claim 2, wherein:
the list identifies the one or more first alarms of the legacy control system derived from state change notifications associated with the legacy control system when the selected control system component selected in the graphical representation is a legacy control system component associated with one or more of the first alarms of the legacy control system; and
the list identifies one or more second alarms of the second control system when the selected control system component selected in the graphical representation is a second control system component associated with one or more of the second alarms of the second control system.

4. The method of claim 1, wherein the graphical user interface comprises:
a graphical representation of control system components in at least one of the legacy control system and the second control system; and
a list identifying a status and any alarms associated with a hybrid control system component selected in the graphical representation, the hybrid control system component having multiple control system views.

5. The method of claim 1, further comprising:
generating a list of outstanding alarms associated with the legacy control system, the list derived from state change notifications associated with the legacy control system; and
using the list during migration of a control system component from the legacy control system to the second control system.

6. The method of claim 1, further comprising:
receiving information associated with one or more second alarms in the second control system;
receiving, from the user via the graphical user interface, an invocation of a second alarm management function; and
performing the invoked second alarm management function for at least one of the one or more second alarms.

7. The method of claim 1, wherein the alarm management function not supported by the legacy control system comprises at least one of:
acknowledging the at least one of the one or more first alarms;
shelving the at least one of the one or more first alarms; and
filtering the at least one of the one or more first alarms.

8. The method of claim 7, wherein:
the legacy control system does not support shelving and filtering of alarms; and
the second control system supports shelving and filtering of alarms.

9. An apparatus comprising:
at least one processor configured to:
receive an electronic communication that includes information associated with one or more first alarms in a first control system, the first control system including at least one legacy controller;
generate a graphical user interface containing information associated with a second control system and the legacy control system, the second control system including at least one controller, and wherein the second control system supports one or more alarm management functions that are not supported by the first control system;
initiate presentation, in the graphical user interface, of at least a portion of the information associated with the one or more first alarms of the first control system;
receive, from a user via the graphical user interface, an invocation of an alarm management function not supported by the first control system, the invocation further supporting one or more functions associated to the second control system, including at least one of:
saving a device configuration for the second control system to a local file,
loading a new or updated device configuration onto the second control system,
dumping an existing device configuration from the second control system, and
shutting down the second control system; and perform the invoked alarm management function using at least one of the one or more first alarms of the first control system and the one or more functions.

10. The apparatus of claim 9, wherein the graphical user interface comprises:
a graphical representation of control system components in at least one of the first control system and the second control system; and
a list identifying any alarms associated with a selected control system component selected in the graphical representation.

11. The apparatus of claim 10, wherein:
the list identifies the one or more first alarms of the first control system derived from state change notifications associated with the first control system when the selected control system component selected in the graphical representation is a first control system component associated with one or more of the first alarms of the first control system; and
the list identifies one or more second alarms of the second control system when the selected control system component selected in the graphical representation is a second control system component associated with one or more of the second alarms of the second control system.

12. The apparatus of claim 9, wherein the graphical user interface comprises:
a graphical representation of control system components in at least one of the first control system and the second control system; and
a list identifying a status and any alarms associated with a hybrid control system component selected in the graphical representation, the hybrid control system component having multiple control system views.

13. The apparatus of claim 9, wherein the at least one processor is further configured to:
receive information associated with one or more second alarms in the second control system;
receive, from the user via the graphical user interface, an invocation of a second alarm management function; and
perform the invoked second alarm management function for at least one of the one or more second alarms.

14. The apparatus of claim 9, wherein the alarm management function not supported by the first control system comprises at least one of:
acknowledging the at least one of the one or more first alarms;
shelving the at least one of the one or more first alarms; and
filtering the at least one of the one or more first alarms.

15. The apparatus of claim 9, wherein the at least one processor is further configured to emulate a node in the first control system in order to obtain the information associated with the one or more first alarms.

16. A non-transitory computer readable medium containing instructions that when executed cause at least one processing device to:
receive information associated with one or more first alarms of a first control system, the first control system including at least one legacy controller;
generate a graphical user interface containing information associated with a second control system and the first control system, the second control system including at least one controller, and wherein the second control system supports one or more alarm management functions that are not supported by the first control system;
initiate presentation, in the graphical user interface, of at least a portion of the information associated with the one or more first alarms of the first control system;
receive, from a user via the graphical user interface, an invocation of an alarm management function not supported by the first control system, the invocation further supporting one or more functions associated to the second control system, including at least one of:
saving a device configuration for the second control system to a local file,
loading a new or updated device configuration onto the second control system,
dumping an existing device configuration from the second control system, and
shutting down the second control system; and
perform the invoked alarm management function using at least one of the one or more first alarms of the first control system and the one or more functions.

17. The non-transitory computer readable medium of claim 16, wherein the graphical user interface comprises:
a graphical representation of control system components in at least one of the first control system and the second control system; and
a list identifying any alarms associated with a selected control system component selected in the graphical representation.

18. The non-transitory computer readable medium of claim 17, wherein:
the list identifies the one or more first alarms of the first control system derived from state change notifications associated with the first control system when the selected control system component selected in the graphical representation is a first control system component associated with one or more of the first alarms of the first control system; and
the list identifies one or more second alarms of the second control system when the selected control system component selected in the graphical representation is a second control system component associated with one or more of the second alarms of the second control system.

19. The non-transitory computer readable medium of claim 16, wherein the graphical user interface comprises:
a graphical representation of control system components in at least one of the first control system and the second control system; and
a list identifying a status and any alarms associated with a hybrid control system component selected in the graphical representation, the hybrid control system component having multiple control system views.

20. The non-transitory computer readable medium of claim 16, further containing instructions that when executed cause the at least one processing device to:
receive information associated with one or more second alarms in the second control system;
receive, from the user via the graphical user interface, an invocation of a second alarm management function; and
perform the invoked second alarm management function for at least one of the one or more second alarms.

21. The non-transitory computer readable medium of claim 16, wherein the alarm management function not supported by the first control system comprises at least one of:
acknowledging the at least one of the one or more first alarms;

shelving the at least one of the one or more first alarms; and filtering the at least one of the one or more first alarms.

22. The non-transitory computer readable medium of claim 16, wherein the information associated with the one or more first alarms comprises one or more of:
   a date and a time of each first alarm;
   a location tag associated with each first alarm;
   a source of each first alarm;
   a condition associated with each first alarm;
   a priority of each first alarm;
   a description of each first alarm; and
   a trip value associated with each first alarm.

\* \* \* \* \*